May 2, 1933.  C. SUNDAHL  1,906,433
BALL BEARING
Filed Jan. 25, 1932
Fig.1.
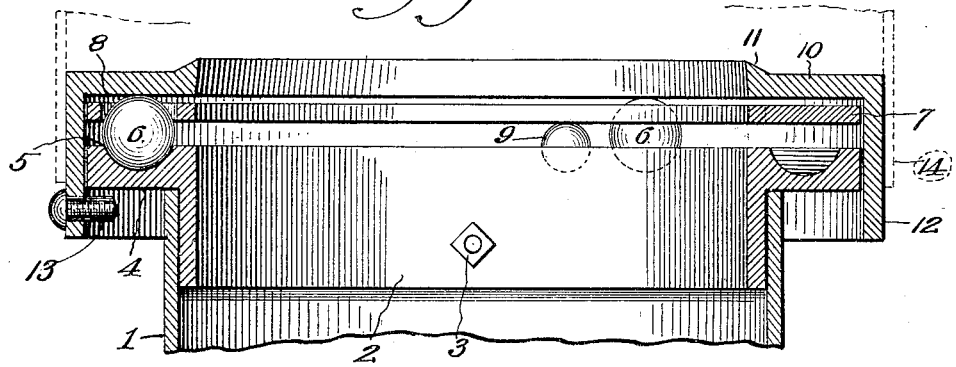
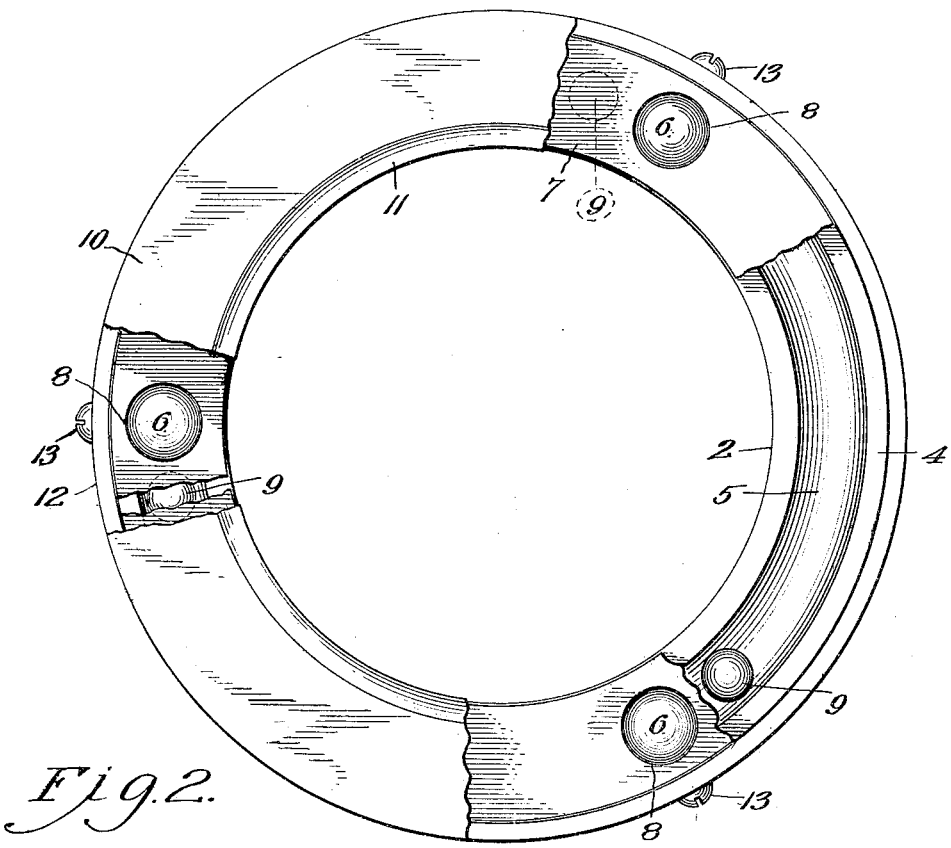
Fig.2.
Inventor
Clarence Sundahl.
By Thorpe & Thorpe
Attorneys Patented May 2, 1933

1,906,433

UNITED STATES PATENT OFFICE

CLARENCE SUNDAHL, OF KANSAS CITY, MISSOURI

BALL BEARING

Application filed January 25, 1932. Serial No. 588,646.

This invention relates to anti-friction bearing constructions for devices adapted for horizontal rotation, such as chimney top and rotary ventilators, for example, though it need not be confined to such use, the object of the invention is to provide a three-point ball bearing of maximum strength and durability which can be manufactured and installed at low cost, and affords a wide or extended support to minimize tilting tendency under wind pressures without restricting or otherwise reducing full passage of air, which is a very desirable result if the bearing is used as a part of a ventilating exhaust system, as in such connection it increases the efficiency of gravity ventilating action.

Another object of the invention is to produce a construction which excludes from the anti-friction elements of the bearing, rain, snow, hail and any other foreign particles which might tend to interfere with the free rotation of the device.

With the above general objects in view and others as will hereinafter appear, the invention consists in certain novel and useful features of construction and organization of parts as hereinafter described; and in order that it may be fully understood, reference is to be had to the accompanying drawing, in which:—

Figure 1 is a central vertical section showing the bearing as applied for use on a ventilator of the rotary cowl type.

Figure 2 is a plan view with the parts broken away to disclose features otherwise hidden.

In the said drawing, where like reference characters indicate corresponding parts in all of the figures, 1 indicates a cylindrical support or base rigid with and forming the top of a chimney or the like, for equipment with a ventilator (not shown) of the horizontally turning or rotating type which serves to facilitate ventilation by suctional action up through the chimney and protects the latter against down-draft, regardless of the direction in which the wind blows.

Referring to the ball-bearing structure upon which the cowl of the ventilator is adapted to be mounted, a ring 2 is fitted and riveted or bolted as at 3 to and within the base or support 1, and provided with an outwardly-projecting circular ball-race flange 4 having a groove or channel 5 in its upper face, containing three large balls 6. A horizontal ring 7 overlies the ball-race flange and is provided with three openings 8 loosely receiving the balls 6, and holding them in equi-spaced relation, and said ring rests upon three smaller balls 9 which run in the ball-race groove and support the ring slightly above the horizontal plane of the centers of balls 6. The ring 7 internally and externally corresponds in diameter approximately to the ball-race flange, so that it is free to turn with balls 6 and does not constrict the ventilating passage or flue.

A horizontally-arranged ring 10 rests upon the balls 6 and is provided at its inner margin with a downwardly and outwardly sloping deflecting bead 11 and at its outer margin with a depending flange 12 which closes the outer side of the space between rings 2 and 10, and secured to and projecting inwardly from the lower edge of the flange 12, are three (or more) equi-spaced lug bolts 13 which underlie the ball-race flange and thus serve to securely hold the ports of the anti-friction construction described, in operative relation regardless of high winds or vibration, shocks or the like.

The anti-friction bearing, as illustrated, may constitute, as hereinbefore suggested, the base of a cowl, provided with a depending circular collar or flange 14 for externally embracing and securement to the flange 12 in any suitable manner, the flange being indicated in dotted lines in Figure 1. By thus securing the cowl in place it will be apparent that it is dependably supported without in any way obstructing the passage of the bearing through which air passes for ventilation purposes. It will be apparent that the ball bearing will operate efficiently and freely even if not set in a perfectly upright position and hence, for that reason, is very desirable as a support for a ventilating cowl as well as for the fact that it in nowise reduces or impairs the ventilating passage or flue. It also possesses the advantage of effecting the external discharge of condensation which occurs on the inner surface of the cowl, as the bead 11 prevents moisture dropping or flowing thereon, from flowing down through the passage of the bearing or entering the ball-race chamber. When the bearing is used as a part of a ventilating equipment, it is effectively protected by the cowl, from rain, snow and hail.

It will be obvious, of course, that if, in a ventilating system, a center brace is required for strengthening the cowl and stiffening the structure against collapse, as might be desirable where the chimney and cowl are of very large diameter, and where a slight reduction in capacity of the ventilating passage would not be objectionable, the cowl may be braced internally in any suitable manner from the ring 10 of the bearing, this arrangement not being illustrated as it would be of any conventional type.

From the above description it will be apparent that I have produced a ball bearing for ventilator cowls or other horizontally rotating devices, which, besides possessing the advantageous features set forth as desirable in the statement of the objects of the invention, is also desirable as adapted to maintain its horizontal position indefinitely because the wear on the balls, ball-races and rotatable ring 10, while negligible, will be uniform or equal because all of the balls are constantly changing their positions and the small balls their positions relative to the larger ones, in the structure. While I have shown the appliance in its preferred form, it is obviously susceptible of modification in details within the spirit and scope of the appended claims.

I claim:—

1. A ball bearing for a horizontally rotatable device, comprising superposed spaced rings, the lower one provided in its upper side with a circular groove, three equi-spaced balls in said groove and supporting the upper ring, smaller balls in the groove between the first-named balls and free to change their positions relative to the two first-named balls between which they lie, and a ring resting upon the smaller balls only and provided with three openings each loosely receiving one of the first-named balls and holding the same in equi-spaced relation and means for preventing dislocation of the upper spaced ring.

2. A ball bearing for a horizontally rotatable device, comprising superposed spaced rings, three balls upon the lower ring and underlying and engaging the upper one as a support therefor, smaller balls on the lower ring between the first-named balls, a ring resting upon the smaller balls and provided with openings loosely receiving the upper parts of the first-named balls to hold the latter equal distances apart, the first-named ring having a circular groove receiving the smaller balls to insure movement thereof only in a circular path, and means for preventing separation movement between the said superposed rings.

3. A ball bearing for a horizontally rotatable device, comprising superposed spaced rings, three balls upon the lower ring and underlying and engaging the upper one as a support therefor, smaller balls on the lower ring between the first-named balls, a ring resting upon the smaller balls and provided with openings loosely receiving the upper parts of the first-named balls to hold the latter equal distances apart; the ring resting on the first-named balls having a circular flange depending around the other rings, and pins extending inwardly from said flange and underlying the ring affording support for both sets of balls.

In testimony whereof I affix my signature.

CLARENCE SUNDAHL.